United States Patent
Checcacci et al.

(10) Patent No.: US 10,794,120 B2
(45) Date of Patent: Oct. 6, 2020

(54) PLANT MODULE WITH PERFORATED BEAMS

(71) Applicant: Nuovo Pignone Tecnologie Srl, Florence (IT)

(72) Inventors: Emanuele Checcacci, Florence (IT); Alessio Margiotta, Florence (IT); Irene Martinelli, Florence (IT); Francesca Galardi, Florence (IT); Alessandro Zuliani, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 15/993,632

(22) Filed: May 31, 2018

(65) Prior Publication Data

US 2018/0347285 A1 Dec. 6, 2018

(30) Foreign Application Priority Data

Jun. 1, 2017 (IT) .......................... 102017000060596

(51) Int. Cl.

| | |
|---|---|
| *F16M 1/00* | (2006.01) |
| *E21B 15/00* | (2006.01) |
| *B65B 59/04* | (2006.01) |
| *F16M 1/02* | (2006.01) |
| *F16M 1/04* | (2006.01) |
| *F01D 25/28* | (2006.01) |
| *F16L 3/22* | (2006.01) |

(52) U.S. Cl.
CPC ............ *E21B 15/003* (2013.01); *B65B 59/04* (2013.01); *F16M 1/00* (2013.01); *F16M 1/02* (2013.01); *F16M 1/04* (2013.01); *F01D 25/28* (2013.01); *F16L 3/22* (2013.01)

(58) Field of Classification Search
CPC ....... E21B 15/003; B65B 59/04; F01D 25/28; F16L 3/00; F16M 1/00; F16M 1/02; F16M 1/04
USPC .......................................................... 248/672
See application file for complete search history.

(56) References Cited

U.S. PATENT DOCUMENTS 3,330,514 A 7/1967 Williams
4,077,428 A * 3/1978 Weaver ................ E21B 41/005
137/565.01

(Continued)

FOREIGN PATENT DOCUMENTS

| | | |
|---|---|---|
| DE | 851 573 C | 10/1952 |
| EP | 0 006 116 A1 | 1/1980 |
| WO | 2010/075390 A2 | 7/2010 |

OTHER PUBLICATIONS

Italian Search Report and Written Opinion issued in connection with corresponding IT Application No. 102017000060596 dated Feb. 7, 2018.

*Primary Examiner* — Nkeisha Smith
(74) *Attorney, Agent, or Firm* — Baker Hughes Patent Organization

(57) ABSTRACT

The plant module comprises a base deck, a frame and a plurality of pieces of equipment mounted to the base deck and/or the frame; the base deck comprises of a grid of base beams; some of or all the beams of the base deck and optionally some of or all the beams of the frame are perforated, in particular castellated-type or cellular-type, so that they have a plurality of holes, in particular web-openings, for receiving conduits and/or pipes and/or trays.

10 Claims, 2 Drawing Sheets

(56) References Cited

U.S. PATENT DOCUMENTS

| | | | | |
|---|---|---|---|---|
| 7,000,279 B2* | 2/2006 | Szekely | .................. | E01C 11/24 |
| | | | | 14/69.5 |
| 7,988,122 B2* | 8/2011 | Kim | ........................ | F16F 15/02 |
| | | | | 248/637 |
| 9,934,885 B2* | 4/2018 | Broughton | ................ | F02C 7/32 |
| 9,970,193 B1* | 5/2018 | Boxer | .................... | E02D 27/16 |
| 2011/0283643 A1* | 11/2011 | Rubel | ....................... | E04B 1/24 |
| | | | | 52/327 |
| 2017/0254148 A1* | 9/2017 | Kannegaard | ............ | E21B 15/02 |
| 2018/0327979 A1* | 11/2018 | Szekely | .................. | E02D 17/20 |
| 2019/0017228 A1* | 1/2019 | van Raam | .......... | A01G 13/0268 |

\* cited by examiner

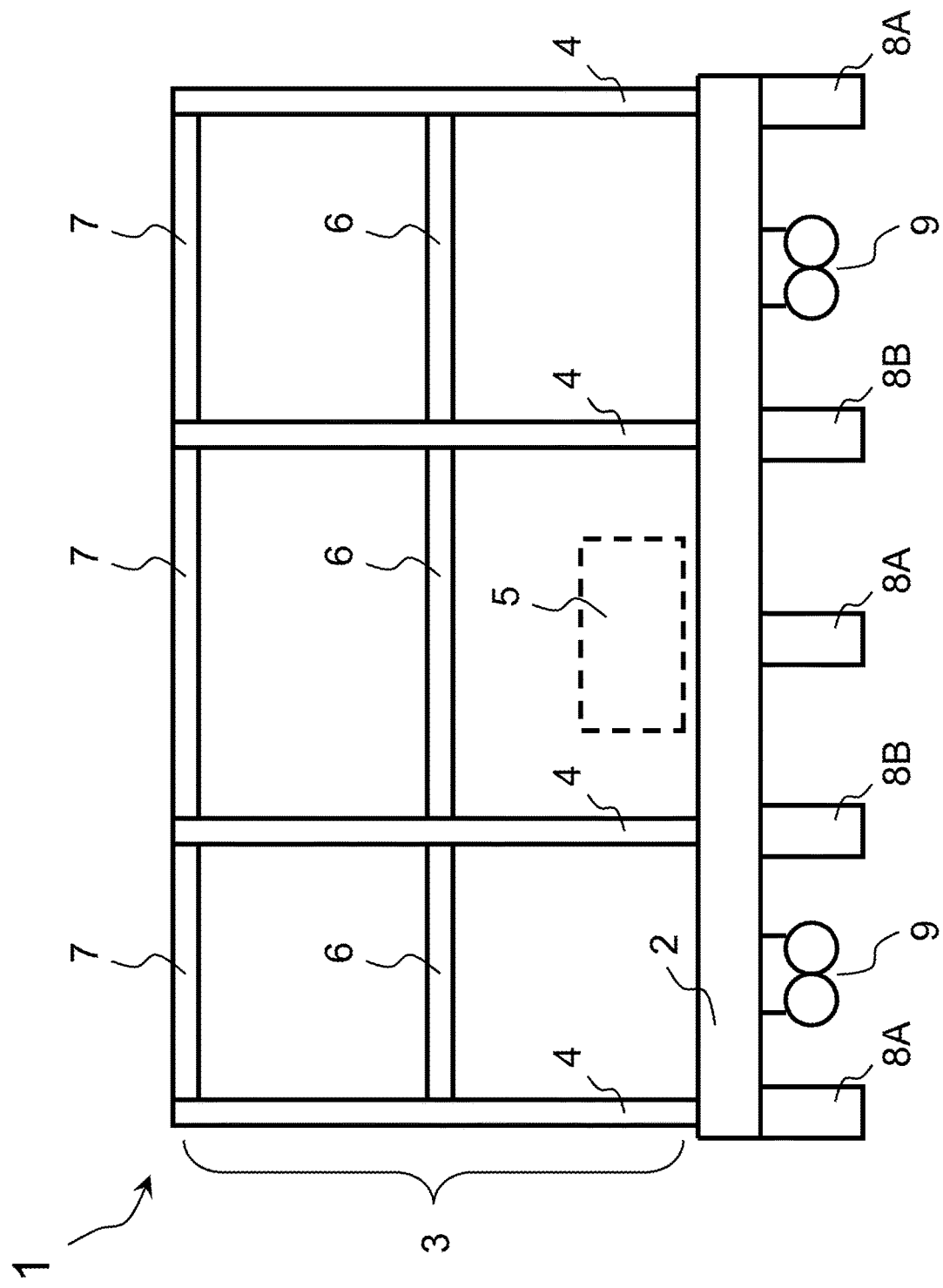

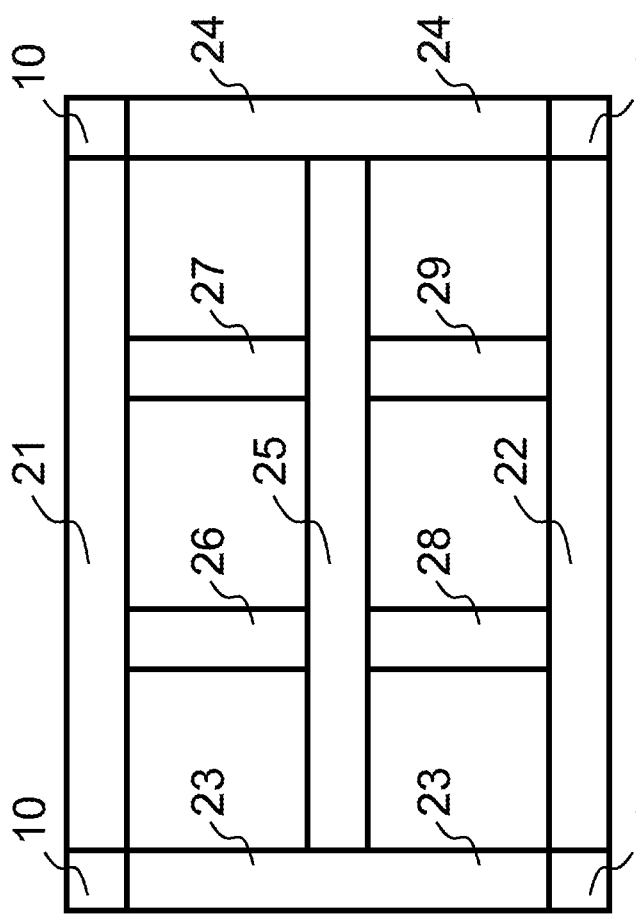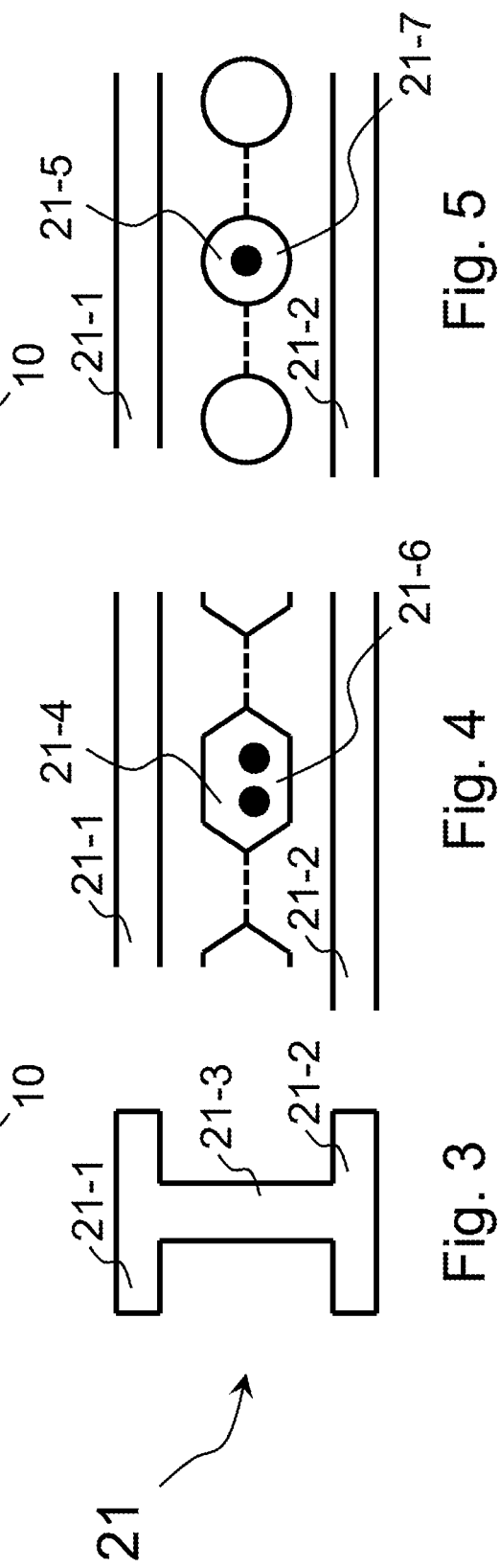

PLANT MODULE WITH PERFORATED BEAMS

Embodiments of the subject matter disclosed herein correspond to plant modules with perforated beams.

BACKGROUND ART

In the field of "Oil & Gas", few years ago, some machine manufacturers started to sell and deliver pre-assembled plant modules comprising typically a plurality of pieces of equipment, in particular turbomachines.

Typically, the structure of such modules comprises a base deck and a frame. Typically, both the base deck and the frame comprise a plurality of metal support beams joined together; in particular, the base deck often consists of a bi-dimensional grid of beams that may be called "base beams"; in particular, the frame often consists of a three-dimensional grid of horizontal beams and vertical beams that may be called "columns".

A plurality of pieces of equipment, such as turbomachines and reciprocating machines (e.g. turbines, compressors, pumps), combustors, motors, engines, coolers, filters, are mounted to the base deck of the module and/or the frame of the module.

At least at the base deck level a plurality of conduits and/or pipes and/or trays must be placed. The conduits may house for example electric wires. The pipes may feed for example fluids. The trays may support for example cables.

In order to route wires, pipes, cables according to the needs of the equipment it is often necessary to overtake and go around support beams so that the conduits and/or the pipes have several sharp bends that are disadvantageous. Sharp bends may cause wear and/or tear of the wires. Sharp bends may cause high pressure drops, i.e. losses, in the fluid flowing inside a pipe.

It would be desirable to facilitate routing of conduits and/or the pipes and to reduce the number of sharp bends of the conduits and/or the pipes in the module.

SUMMARY

Embodiments of the subject matter disclosed herein relate to plant modules.

According to such embodiments, the plant module comprises a base deck, a frame and a plurality of pieces of equipment mounted to the base deck and/or the frame; the base deck comprises or consists of a grid of base beams; the frame comprises a plurality of frame beams; some of or all the base beams are perforated (i.e. machined to create openings) whereby they have a plurality of holes for receiving conduits and/or pipes and/or trays.

Such beams, i.e. base beams and frame beams, are support beams, i.e. elongated elements that constitute the structure of the module and that support the pieces of equipment of the module. It is to be noted that a plant module may comprise other elongated elements, in particular metal elongated elements, that may be called "beams" but that are not "support beams".

It is to be noted that perforating a beam located at the base of a structure is counter-intuitive; in fact, it might endanger the stability of the structure.

Perforated beams are sometimes used at the top of a building in order to make it lighter, but never at the bottom of a building.

It is believed that perforated beams have never been used in plant modules, even less at the base deck of plant modules, i.e. at the bottom of plant modules.

Furthermore, it is to be noted that the beams of plant modules should be able to resist to static stresses when the module is stationary (for example at a manufacturing plant, on a ship, at an installation site), static stresses when the module is in motion (for example from a manufacturing plant to a ship or from a ship to an installation site), dynamic stresses when the module is at an installation site and its pieces of equipment are working.

Therefore, it would be even less intuitive to think of using perforated beams in a plant module.

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings:

FIG. 1 shows a schematic lateral view of an embodiment of a plant module,

FIG. 2 shows a schematic top view of the base deck of the plant module of FIG. 1, FIG. 3 shows a cross-section of an embodiment of a base beam, FIG. 4 shows a partial lateral view of a first embodiment of a base beam, and FIG. 5 shows a partial lateral view of a second embodiment of a base beam.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The expression "plant module" is used herein with reference to systems of any size and weight. Anyway, it is to be noted the claimed subject-matter is particularly designed for very big systems having sizes in the range of e.g. 10 m to e.g. 300 m and having weight in the range of e.g. 200 tons to 2000 tons or above (typically, the weight of the structure without equipment is in the range of e.g. 50 tons to 500 tons); smaller systems are sometimes called "equipment skids".

Referring to FIG. 1, there is a plant module 1 with a base deck 2 and a frame 3. A set of pieces of equipment are schematically shown as a single rectangle 5 in dashed line; the set of pieces of equipment comprises at least one turbomachine or reciprocating machine (e.g. turbine, compressor, pump) and/or at least one combustor and/or at least one motor or engine and/or at least one cooler and/or at least one filter.

Frame 3 comprises a set of vertical beams 4, that may be called "columns", a set of horizontal beams 6 belonging to a "first floor" or "first deck", and a set of horizontal beams 7 belonging to a "second floor" or "second deck". Beams 6 are coupled together and to columns 4. Beams 7 are coupled together and to columns 4. Columns 4 are coupled to base deck 2. The frame beams are typically straight, even if curved or angled shapes should not be excluded. The frame beams may be either directly or indirectly connected. The frame beams may be either fixedly or removably connected. Typically, the connection of the frame beams is carried out by welding and/or rivets and/or bolts. Typically, the connection of the frame beams is either direct or through joint pieces.

The base deck may be provided with static supports and/or dynamic (or motion) supports. Base deck 2 is provided with both static supports 8A and 8B and dynamic supports 9. Supports 8A are foundation supports to be used for example at an installation site. Supports 8B are temporary supports to be used for example at a manufacturing plant or on a ship. Supports 9 are trailers to be used for example during motion of the plant module 1 from a manufacturing plant to a ship or from a ship to an installation site.

Referring to FIG. 2, there is base deck 2 of plant module 1 consisting of a grid of beams 21-29, that may be called "base beams" (according to alternative embodiments the base deck may comprise other components); base deck 2 is designed to be positioned horizontally so the "base beams" are also "horizontal beams". There are for example four peripheral beams 21, 22, 23, 24, one longitudinal internal beam 25 and four transversal internal beams 26, 27, 28, 29. The base beams are typically straight, even if curved or angled shapes should not be excluded. The base beams may be either directly or indirectly connected. The base beams may be either fixedly or removably connected. Typically, the connection of the base beams is carried out by welding and/or rivets and/or bolts. Typically, the connection of the base beams is either direct or through joint pieces. The base beams 21-29 are connected together; in particular, there are four angular joint pieces 10 for connecting the four peripheral beams.

FIG. 3 shows a possible cross-section of peripheral base beam 21; peripheral base beams 22, 23, 24 may have the same cross-section. The other base beams 25, 26, 27, 28, 29 may have for example, the same or a similar cross-section.

FIG. 4 shows a partial lateral view of a first embodiment of peripheral base beam 21 with hexagonal web openings (i.e. openings in the web)—so-called "castellated-type" beam; peripheral base beams 22, 23, 24 may have the same lateral view. One or more of the other base beams 25, 26, 27, 28, 29 may have for example, the same or a similar lateral view.

FIG. 5 shows a partial lateral view of a second embodiment of peripheral base beam 21 with circular web openings (i.e. openings in the web)—so-called "cellular-type" beam; peripheral base beams 22, 23, 24 may have the same lateral view. One or more of the other base beams 25, 26, 27, 28, 29 may have for example, the same or a similar lateral view.

It is to be noted that FIG. 3, FIG. 4 and FIG. 5 may also apply to a frame beam, e.g. any frame beams 4, 6 or 7. Typically, frame beams have a cross-section smaller than base beams.

In general, the plant module (for example 1 in FIG. 1) has a base deck (for example 2 in FIG. 1), a frame (for example 3 in FIG. 1) and a plurality of pieces of equipment (for example 5 in FIG. 1) mounted to the base deck (for example 2 in FIG. 1) and/or the frame (for example 3 in FIG. 1); the base deck (for example 2 in FIG. 1) comprises or consists of a grid of base beams (for example 21-29 in FIG. 2); the frame (for example 3) comprises a plurality of frame beams (for example 4, 6, 7 in FIG. 1); some of or all the base beams (for example 21-29 in FIG. 2) are perforated (i.e. machined to create openings) so that they have a plurality of holes (for example 21-4, 21-5 in FIG. 4 and FIG. 5) for receiving conduits and/or pipes (for example 21-6, 21-7 in FIG. 4 and FIG. 5) and/or trays. The conduits are typically designed to house electric wires and the pipes are typically designed to feed fluids.

In general, the holes in the base beams can take any suitable shape.

In general, the holes in the base beams can take any size suitable for encompassing conduits and/or pipes, and for avoiding cutting, binding, chafing (in general damage) the conduits and/or pipes during assembly and operation of the module.

A tray may be mounted to a hole and serves to support one or more conduits and/or one or more pipes; a tray may be used also for supporting directly one or more cables.

The conduits and pipes may be configured to couple with pieces of equipment internal and/or external to the plant module.

According to some embodiments, all the base beams are perforated, cellular-type or castellated-type, cellular-type (i.e. with rounded shape).

According to some embodiments, the plant module comprises a first plurality of conduits and/or pipes and/or trays. In FIG. 4, for example, there are two pipes 21-6. In FIG. 5, for example, there is one conduit 21-7. In an embodiment, these conduits and/or pipes pass through the holes of the base beams (for example 21-29 in FIG. 2).

According to some embodiments, at least some of the frame beams (for example 4, 6, 7 in FIG. 1) are perforated so that they have a plurality of holes. Some or all of these holes may be useful for lightening the module.

According to some embodiments, the plant module comprises a second plurality of conduits and/or pipes and/or trays. In an embodiment, these conduits and/or pipes pass through the holes of the frame beams (for example 4, 6, 7 in FIG. 1).

The conduits of the first and/or second plurality may house electric wires.

The pipes of the first and/or second plurality may feed fluids.

The trays of the first and/or second plurality may support cables; such supported cables pass through the holes of the base and/or frame beams.

The following may be better understood by considering FIGS. 3, 4 and 5.

At least some of the base beams (for example 21-29 in FIG. 2) and/or frame beams (for example 4, 6, 7 in FIG. 1) may have an H-shaped cross-section; this is shown for example in FIG. 3. The beam 21 has an upper flange 21-1 (that is arranged horizontally), a lower flange 21-2 (that is arranged horizontally), and a connecting web 21-3 (that is arranged vertically).

In an embodiment, an H-shaped cross-section beam is a union of two T-shaped cross-section beams; this is shown for example in FIG. 4 and FIG. 5 through the dashed line in the middle of the web.

More particularly and as shown in the beams shown in FIG. 4 and FIG. 5, the holes of the beams are in the web portions of the beams (so called "web-openings").

If the holes in a H beam are in the web and if the H beam is the union of two T beams material and time is saved when manufacturing the finished beam for the plant module.

The invention claimed is:

1. A plant module comprising:
   a base deck comprising a plurality of base beams;
   a frame coupled to the base deck and comprising a plurality of frame beams extending from the base deck such that the frame is developed above the base deck; and
   a plurality of pieces of equipment mounted to said base deck and/or said frame,
   wherein the base beams are castellated-type and/or cellular-type beams each respectively comprising a web defining a plurality of openings therethrough along the length of the web configured to receive conduits and/or pipes and/or trays, and the base beams and frame beams have an H-shaped comprised of a union of two T-shaped cross-section beams.

2. The plant module of claim 1, wherein the plurality of openings are equally spaced relative to each other along a length of the web.

3. The plant module of claim 1, wherein all the base beams are castellated-type and/or cellular-type beams.

4. The plant module of claim 1, further comprising a plurality of conduits and/or pipes and/or trays extending through one or more of the plurality of openings of some or all of the base beams.

5. The plant module of claim 1, wherein at least some of the frame beams are castellated-type and/or cellular-type beams comprising webs defining a plurality of openings therethrough configured to receive conduits and/or pipes and/or trays.

6. The plant module of claim 5, further comprising a plurality of conduits and/or pipes and/or trays extending through one or more of the plurality of openings of some or all of the frame beams.

7. The plant module of claim 1, wherein said H-shaped cross-section consists of the web and two flanges, and wherein at least some H-shaped cross-section beams are arranged so that the web is vertical.

8. The plant module of claim 1, wherein the plurality of base beams are arranged in a grid pattern.

9. The plant module of claim 1, wherein the plurality of pieces of equipment comprises at least one turbomachine or reciprocating machine, in particular a turbine or a compressor or a pump, and/or at least one combustor and/or at least one motor or engine and/or at least one cooler and/or at least one filter.

10. The plant module of claim 1, wherein the plant module is transportable.

* * * * *